United States Patent [19]

Kelsey

[11] Patent Number: 5,278,305

[45] Date of Patent: Jan. 11, 1994

[54] CATALYSTS FOR RING-OPENING, METATHESIS POLYMERIZATION OF CYCLIC OLEFINS

[75] Inventor: Donald R. Kelsey, Fulshear, Tex.

[73] Assignee: Shell Oil Company, Houston, Tex.

[21] Appl. No.: 999,033

[22] Filed: Dec. 31, 1992

[51] Int. Cl.$^5$ .................. C08F 4/22; C08F 4/20; C08G 61/08

[52] U.S. Cl. .................. 526/135; 526/133; 526/134; 526/142; 526/143; 526/166; 526/169; 526/283; 526/308; 502/111; 502/117; 502/169; 502/172; 264/328.2; 264/331.13; 264/331.17; 252/182.18

[58] Field of Search .......... 526/142, 143, 135, 133, 526/283, 308, 134, 166, 169; 502/111, 117, 169, 172, 224, 228; 264/328.2, 331.13; 252/182.18

[56] References Cited

U.S. PATENT DOCUMENTS

| | | | |
|---|---|---|---|
| 3,681,315 | 8/1972 | Yagi et al. | 526/143 |
| 3,933,778 | 1/1976 | Pampus et al. | 526/142 X |
| 4,415,715 | 11/1983 | Bell | 526/142 |
| 4,729,976 | 3/1988 | Sjardijn et al. | 502/102 |
| 4,810,762 | 3/1989 | Sjardijn et al. | 526/166 |
| 4,981,931 | 1/1991 | Bell | 526/166 |
| 5,028,672 | 7/1991 | Sjardijn et al. | 526/128 |
| 5,071,812 | 12/1991 | Kelsey | 502/164 |
| 5,082,909 | 1/1992 | Bell | 526/169 |
| 5,093,441 | 3/1992 | Sjardijn et al. | 526/126 |
| 5,095,082 | 3/1992 | Kelsey | 526/282 |
| 5,142,006 | 8/1992 | Kelsey | 526/142 |
| 5,143,992 | 9/1992 | Kelsey | 526/283 |

FOREIGN PATENT DOCUMENTS 2263312 9/1972 Fed. Rep. of Germany ...... 526/143

*Primary Examiner*—Fred Teskin

[57] ABSTRACT

A catalyst and process for the polymerization of cyclic olefins, such as dicyclopentadiene, are disclosed. The catalyst comprises the reaction product of a transition metal halide and a 1,4-hydroquinone of the general formula:

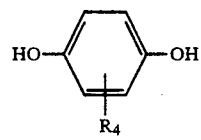

wherein R is independently selected from the group of hydrogen, $C_{1-12}$ alkyl, $C_{6-20}$ aryl, halide, and $C_{1-6}$ haloalkyl. Optional co-catalysts include borohydrides, organo tin hydrides and organo aluminum compounds. Polymerization can be carried out in a reaction injection molding process to prepare a molded article.

25 Claims, No Drawings

CATALYSTS FOR RING-OPENING, METATHESIS POLYMERIZATION OF CYCLIC OLEFINS

BACKGROUND OF THE INVENTION

1. Field of the Invention

The present invention relates to an improved process and catalyst system for the ring-opening or metathesis polymerization of cyclic olefins, such as dicyclopentadiene (DCPD). More specifically, this invention relates to an improved organo transition metal catalyst for metathesis polymerization.

2. Description of the Related Art

Cyclic olefins are subjected to ring-opening metathesis polymerization to produce thermoplastic and thermoset polymers having physical properties which make them suitable for structural and electronic applications, such as molded plastic items and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. For example, the presence of unreacted monomers in molded polydicyclopentadiene has been found to result in a molded part with an unpleasant odor, and less than optimum physical properties. Finding a RIM process that reacts in as short a cycle time as possible and at mold temperatures at or near room temperature is economically desirable. It is also advantageous to be able to use a less than pure monomer stream and thus avoid extensive purification of the monomer prior to polymerization.

Numerous patents and literature references relate to such polymerization in the presence of a variety of olefin metathesis catalysts. Among the more effective ring-opening polymerization catalysts are homogenous catalyst systems based on tungsten or molybdenum halides, often employed with an organotin or organoaluminum co-catalyst. Examples of such catalyst systems are disclosed by Sjardijn et al., U.S. Pat. Nos. 4,810,762 and 5,093,441, wherein phenolic tungsten halides are used with organotin hydrides. Similar catalyst systems are disclosed by Sjardijn et al. in U.S. Pat. No. 4,729,976, which have been found to be highly active in a relatively impure DCPD feed stream.

For most cyclic olefin metathesis catalyst systems, the presence of reactive materials such as water and oxygen should be avoided because they foul the polymerization process. Small amounts of reactive material may be acceptable, but water in excess of 20 parts per million (ppm) should generally be avoided. As a result, it is usually necessary to thoroughly dry the cyclo olefin monomers prior to contact with the polymerization catalyst, and to conduct the polymerization in an inert environment.

Cyclic olefins are commonly protected from oxidation and subsequent degradation by the addition of stabilizers such as catechol, e.g. 4-t-butyl catechol. Such stabilizers are necessary because oxidation of the cyclic olefin, even in small amounts, can effectively inhibit or prevent desired metathesis polymerization thereby rendering the catalyst system ineffective. However, the catechol stabilizers themselves also interfere with the reactivity of metathesis catalysts. 1,4-Hydroquinones are also suitable as oxidation stabilizers for the cyclic olefin monomer.

SUMMARY OF THE INVENTION

The present invention provides an improved cyclic olefin metathesis catalyst system for the ring-opening polymerization of cyclic olefins, such as dicyclopentadiene. More particularly the invention provides a catalyst system comprising the reaction product of a transition metal halide and an optionally substituted 1,4-hydroquinone, and an optional co-catalyst. The transition metal halide is preferably a tungsten, molybdenum or tantalum halide, most preferably tungsten oxytetrachloride. The 1,4-hydroquinone may be optionally substituted with $C_{1-12}$ alkyl, $C_{6-20}$ aryl, halide, $C_{1-6}$ haloalkyl (such as trifluoromethyl), or any combinations thereof. Suitable hydroquinones include 2,5-di-t-butyl-1,4-hydroquinone and 2,3,5,6-tetrafluoro-1,4-hydroquinone. The catalyst of this invention can be used with a co-catalyst such as organo tin hydrides, borohydrides, or organo aluminum compounds.

The present invention also provides a process for the metathesis polymerization of cyclic olefins, specifically norbornenes. The monomer is mixed with the above-described catalyst system, and the reaction mixture is injected into a mold under conditions sufficient for polymerization of the monomer and formation of a molded article.

DETAILED DESCRIPTION OF THE INVENTION

The Catalyst

The polymerization catalyst described herein is highly reactive in the ring-opening metathesis polymerization of cyclic olefins. Ring-opening metathesis catalysts facilitate the breaking of the monomer ring at double bonds to form linear and crosslinked unsaturated polymers.

The polymerization catalyst of this invention comprises a transition metal complex prepared using 1,4-hydroquinones. It has been found that even though catechol stabilizers inhibit metathesis, the related 1,4-hydroquinones can be used to prepare effective metathesis catalysts.

To obtain high activity of the resulting catalyst, the transition metal is preferably a metal of Group VB or VIB such as molybdenum, tungsten or tantalum. The transition metal starting material is generally in the form of a salt, including such salts as halides, preferably oxyhalides. Suitable halides include chloride, bromide, and fluoride. The transition metal halide is preferably one in which the halide is present in a molar amount of at least three atoms per atom of transition metal. Examples of such transition metal halides include tungsten hexachloride, tungsten oxytetrachloride, tungsten oxytetrabromide, molybdenum oxytetrachloride, molybdenum oxytrichloride, molybdenum trioxyhexachloride, molybdenum trioxypentachloride, molybdenum oxytetrafluoride, molybdenum pentachloride, tantalum pentachloride and molybdenum pentabromide. Some preferred transition metal catalysts, because of their high activity for DCPD polymerization, are tungsten hexachloride, tungsten oxytetrachloride, molybdenum pentabromide, molybdenum oxytrichloride, and mixtures thereof.

The transition metal metathesis catalysts of this invention are the reaction products of the above transition metal salts with optionally substituted 1,4-hydroquinones. The hydroquinone can be represented by the general formula:

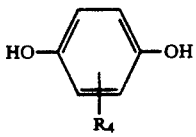

where R is independently selected from hydrogen, $C_{1-12}$ alkyl, $C_{6-20}$ aryl, halide, $C_{1-6}$ haloalkyl and the like.

Examples of suitable substituted 1,4-hydroquinones include 2,5-di-t-butyl-1,4-hydroquinone, 2,3,5,6-tetrafluoro-1,4-hydroquinone, 2-t-butyl-1,4-hydroquinone, 2-chloro-1,4hydroquinone, 2-(2-chlorophenyl)-1,4-hydroquinone, 2,3-dimethyl-1,4-hydroquinone, 1,4-hydroquinone, 2-methyl-1,4-hydroquinone, 2-phenyl-1,4-hydroquinone, 2,3,5-trimethyl-1,4-hydroquinone, and 2-trifluoromethyl-1,4-hydroquinone.

In the preparation of the catalyst, the hydroquinone will generally be present in the reaction mixture in the range of about 0.2 to about 2 moles per mole of the transition metal, preferably from about 0.3 to about 1.5 moles, most preferably about 0.4 to about 1.0 moles.

The reaction product of transition metal salt and hydroquinone can be prepared by contacting, under an oxygen-free inert atmosphere, the hydroquinone compound and the transition metal compound each in an inert organic liquid with mild heat, preferably at a temperature within the range of about 0° C. to about 150° C., and removal of generated hydrogen halide. Suitable inert organic liquids for the reaction include cyclopentane, cyclohexane, benzene, toluene, xylene, chlorobenzene and dichlorobenzene. The inert organic liquid is then preferably distilled off under vacuum.

The Co-Catalyst

The catalyst of the present invention may be used in combination with one or more co-catalysts for ring opening polycycloolefin polymerization. An example of a suitable co-catalyst is a borohydride co-catalyst, including those compounds which can be represented by the formula $[Y+][BH_mZ_n]-$, in which Y+ represents an organic or organometallic cationic counterion, Z is a substituent group such as alkyl, cyano, halide, and the like, $m>0$ and $m+n=4$. Particularly preferred are borohydrides represented by the formula $[R'_3P]_2[M+]BH_4$, in which each R' is independently selected from $C_{1-20}$, preferably $C_{2-12}$, hydrocarbyl, preferably aryl. Examples of such borohydrides include transition metal-based borohydrides such as bis(triphenylphosphine) copper (I) borohydride and ammonium borohydrides such as bis(triphenylphosphoranylidene) ammonium borohydride.

Effectiveness of the borohydride depends to some extent on its solubility in the monomer to be polymerized. Borohydrides with poor solubility such as sodium triethyl borohydride, sodium borohydride and tetrabutyl ammonium borohydride are generally not active co-catalysts in non-polar cyclic olefins such as DCPD. Preferred co-catalysts, because of their activity in DCPD and similar monomers, are those represented by the above borohydride formula in which $m=4$, $n=0$ and Y+ includes aromatic groups such as triarylphosphine and tetraaryldiphosphine, such as 1,2-bis(diphenylphosphine)ethane, moieties.

Suitable co-catalysts can also include, for example, an organo aluminum compound, including trialkyl aluminum, alkylaluminum dihalides, dialkyl aluminum halides or alkyl(alkyloxy) aluminum halides. Suitable co-catalysts can also include an organo tin hydride compound, including compounds which can be represented by the formula $Sn(R')_3H$, in which each R' is selected independently from hydrogen, substituted or unsubstituted aryl, or $C_{1-20}$ alkyl. Specific examples of such co-catalysts include ethyl aluminum chloride, diethyl aluminum chloride, trioctyl aluminum, tributyltin hydride, tripentyltin hydride, diphenyltin dihydride, trioctyltin hydride, methyldicyclohexyltin hydride, cyclopentyldimethyltin hydride, triphenyltin hydride, phenyldimethyltin hydride and allyltin trihydride. Tributyltin hydride, trioctyltin hydride, and triphenyltin hydride are preferred catalysts. Substituents on the R' groups in the above formula can include, for example, $C_{1-20}$ alkoxy and halides.

Catalyst System

As used herein, the catalyst system composition comprises the transition metal metathesis catalyst and optionally a co-catalyst. The catalyst system may further contain a moderator or a boron halide promoter. The co-catalyst is present in the catalyst system composition in an amount effective to enhance the activity of the 1,4-hydroquinone transition metal complex catalyst, which will vary depending upon the specific components present and the reaction conditions. In general, the co-catalyst is preferably present in a molar amount of from about 15:1 to about 1:1, more preferably from about 8:1 to about 2:1, based on moles of transition metal catalyst.

The catalyst system may include a moderator to delay the initiation of polymerization if the selected catalyst and co-catalyst cause instant polymerization upon contact. Ethers, esters, ketones, nitriles and polar cyclic olefins are among suitable moderators for catalyst systems comprising tungsten catalyst and alkyl aluminum co-catalyst. Ethyl benzoate, butyl ether bis(2-methoxyethyl) ether and polar cyclic olefins are preferred moderators. Moderators are generally not necessary for catalyst systems having a tin hydride or borohydride co-catalyst.

The catalyst system may also optionally include a boron halide promoter, including boron trihalides, boron trihalide complexes and tetrahaloborates. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the cocatalyst, and amounts of boron halide above the optimum may inhibit polymerization. The presently-preferred boron halides, because of their high activity and stability, are boron trifluoride and its ethyl ether and butyl ether complexes.

Preferred Catalyst Preparation

The preferred catalyst composition of the invention includes the reaction product of a tungsten halide with 2,5-di-t-butyl-1,4-hydroquinone or 2,3,5,6-tetrafluoro-1,4-hydroquinone catalyst and an optional tributyltin hydride co-catalyst. These catalysts have been found to exhibit high activity in the polymerization of DCPD.

The above catalyst composition is preferably prepared by reacting about one mole of a 1,4-hydroquinone with about two moles of transition metal halide such as tungsten hexachloride or tungsten oxytetrachloride, or mixture thereof, in dry inert solvent such as toluene at a temperature within the range of about 25° to about 95° C., preferably about 40° to about 75° C., under oxygen-free argon. Hydrogen chloride by-product is swept out of the reaction and the toluene is distilled off under vacuum. The reaction product is preferably stored heat at room temperature or dissolved in an inert organic solvent such as toluene. Any cocatalyst is generally combined with the transition metal catalyst in the reaction mixture as a solution of the monomer to be polymerized. The boron halide promoter, if used, is generally combined with the transition metal and/or co-catalyst solution.

Polymerization

The polymerization process of the invention involves contacting one or more cyclic olefin monomers with the catalyst system composition. Preferred cyclic olefin monomers and comonomers include polycyclicolefins containing a norbornene (bicyclo[2.2.1]-heptene) group which can be represented by the structural formulas:

in which each R″ is selected independently from hydrogen, $C_{1-20}$ alkyl, $C_{1-20}$ alkenyl, $C_{3-8}$ cycloalkyl, $C_{3-8}$ cycloalkenyl and $C_{6-20}$ aryl and, with R″ groups linked together through carbon atoms, saturated and unsaturated cyclic hydrocarbon groups. Included in such monomers and comonomers are dicyclopentadiene, norbornene, norbornadiene, 5-(2-propenyl)norbornene, cyclohexenylnorbornene [5-(3-cyclohexen-1-yl)bicyclo[2.2.1]hept-2-ene], and the like; and adducts of vinylcyclohydrocarbons, e.g. 4-vinylcyclohexene and cyclopentadiene or 3,5-divinylcyclopentene and cyclopentadiene and others as described in Kelsey, U.S. Pat. Nos. 5,095,082 and 5,143,992. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83-95%) dicyclopentadiene monomer. An advantage of the invention catalyst is that it is very active in relatively impure (90-95%) dicyclopentadiene.

The ring-opening polymerization of the invention is conducted by contacting the cycloolefin monomer and the catalyst system under polymerization conditions. It is, on some occasions, useful to provide an inert diluent in order to solubilize the catalyst system components. The catalyst system components will typically have the necessary solubility in the cycloolefin to be polymerized and in the preferred embodiment no added diluent is employed and the catalyst system components and the cycloolefinic monomer are contacted directly. Suitable polymerization conditions for such contacting include a polymerization temperature of from about 20° C. to about 250° C. with polymerization temperatures from about 30° C. to about 150° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

The inventive polymerization process is preferably carried out by reaction injection molding (RIM), in which a solution of the catalyst system, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, anti-oxidants, stabilizers, pigments, elastomers or other materials provided to influence the properties of the polymerization product. A particularly contemplated embodiment of the process is in a reaction injection molding (RIM) process. Because of the relatively low initial rate of reaction, the monomer and catalyst system are mixed, typically by providing each component of the catalyst system with a portion of the cycloolefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

In an alternative RIM polymerization technique, a stream of the transition metal catalyst component in the monomer to be polymerized and a monomer stream containing any co-catalyst employed are combined in the mixing head of a RIM machine just prior to injection of the combined stream into a mold. The boron halide promoter, if used, is injected into the mixing head with the transition metal stream, with the co-catalyst stream, or in a separate monomer solution stream.

The initial mold temperature will generally be within the range of about 20° to about 200° C., preferably about 30° to about 150° C. The mold pressure is generally within the range of about 10 to about 50 psi. After injection of the catalyst and monomer into the mold, there is typically an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The polymerized products of this invention are soluble linear themoplastic polymers or hard, insoluble, crosslinked thermoset polymers having utility such as parts for cars, agriculture, housings for instruments or machines, in electronics, and marine applications.

The invention is further described by the following examples which should not be regarded as limiting.

EXAMPLES 1-16

Three different catalysts were prepared using hydroquinones and tungsten oxytetrachloride. The 1,4-hydroquinones utilized were 2,5-di-t-butyl-1,4-hydroquinone and 2,3,5,6-tetrafluoro-1,4-hydroquinone. As a comparative example, 4-t-butylcatechol (a 1,2-hydroquinone) was also used.

Tungsten oxytetrachloride (Aldrich; 1.71 g, 5 mmol) and 5 mls dry, degassed toluene were charged to a reaction flask under nitrogen. A solution of 2,5-di-t-butyl-1,4-hydroquinone (Aldrich; 0.5614 g, 2.5 mmol in 55.6 g dry, degassed toluene) was added by syringe under argon, and rinsed in with an additional 5 mls of toluene. The mixture was heated at 70° C. for about 23.5 hours under argon flow to remove the HCl produced by the reaction (the HCl was trapped by polyvinylpyridine). The toluene was then removed by distillation under vacuum at 24°-50° C.

This process was repeated for the other two hydroquinones, using a molar ratio of 2.5 mmol hydroquinone to 5.0 mmol $WOCl_4$. Utilizing this process with 2,5-di-t-butyl-1,4-hydroquinone yielded 1.48 g of black-blue powder, 2,3,5,6-tetrafluoro-1,4-hydroquinone yielded 1.46 g of purple powder, and 4-t-butylcatechol yielded 1.24 g black-purple-brown crystals.

The hydroquinone catalysts were then used for a laboratory polymerization of DCPD. The polymerizations were carried out in a 90° C. oil bath. The following table shows the polymerization results for various mixtures and co-catalysts:

| | | POLYMERIZATION OF DICYCLOPENTADIENE[a] | | | | | |
|---|---|---|---|---|---|---|---|
| | DCPD/W | | Cocatalyt/W/$BF_3$[c] | Onset | | Exotherm Maximum | |
| Example | (mol/mol) | Cocatalyst[b] | (mol/mol/mol) | Time (min) | T (°C.) | Time (min) | T (°C.) |
| | | | 2,5-di-t-butyl-1,4-hydroquinone[d] | | | | |
| 1 | 2050/1 | TBTH | 3.7/1/— | 6.2 | 94 | 7.3 | 183 |
| 2 | 3190/1 | TBTH | 4/1/0.26 | 3.2 | 93 | 3.9 | 196 |
| 3 | 2050/1 | $CuBH_4$ | 4/1/— | NE, gelled after 15 min. | | | |
| 4 | 1030/1 | none | | NE, thickened after 30 min. | | | |
| | | | 2,3,5,6-tetrafluoro-1,4-hydroquinone[d] | | | | |
| 5 | 2090/1[e] | TBTH | 3.8/1/— | 2.6 | 47 | 4.1 | 188 |
| 6 | 3190/1[e] | TBTH | 4.1/1/0.26 | 3.3 | 65 | 4.4 | 189 |
| 7 | 2050/1 | $CuBH_4$ | 4/1/— | 1.4 | 66 | 21.9 | 107 |
| 8 | 1020/1 | none | | NE, partially gelled after 30 min. | | | |
| | | | 4-t-butylcatechol[d] | | | | |
| 9 | 1990/1[f] | TBTH | 3.6/1/— | NE, soft gel after 40 min. | | | |
| 10 | 2050/1[e] | TBTH | 3.7/1/— | NE, soft gel after 25 min. | | | |
| 11 | 3100/1[e] | TBTH | 4/1/0.26 | NE, soft gel after 12 min. | | | |
| 12 | 3100/1[f] | TBTH | 4/1/0.26 | 3.7 | 57 | 6.1 | 169 |
| 13 | 2050/1[e] | $CuBH_4$ | 4/1/— | NE, soft gel after 30 min. | | | |
| 14 | 2050/1[f] | $CuBH_4$ | 4/1/— | NE, soft gel after 30 min. | | | |
| 15 | 1030/1[e] | none | | NR after 25 min. | | | |
| 16 | 1030/1[f] | none | | NR after 30 min. | | | |

NE = no exotherm; NR = no reaction
[a]Bulk polymerizations (90° C. bath) of 16 g DCPD.
[b]TBTH = tributyltin hydride; $CuBH_4$ = Bis(triphenylphosphine)copper (I) borohydride.
[c]$BF_3$ dibutyl ether complex.
[d]See catalyst prepartion.
[e]Some catalyst undissolved.
[f]Catalyst predissolved as 7.5 wt % solution in toluene.

As can be seen from the Table, the catalysts containing the products of reacting 1,4-hydroquinones and a tungsten metal halide are effective cyclic olefin metathesis polymerization catalysts. In contrast to the 1,4-hydroquinones, similar compounds prepared from 1,2-hydroquinones are ineffective metathesis catalysts.

While various modifications and changes will be apparent to one having ordinary skill in the art, such changes are included in the spirit and scope of this invention as defined by the appended claims.

What is claimed is:

1. A cyclic olefin metathesis polymerization catalyst composition comprising the product of reacting a transition metal halide of Group VB or VIB metal and a hydroquinone compound of formula:

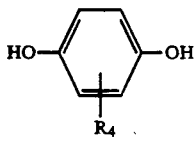

in which R is independently selected from the group consisting of hydrogen, $C_{1-12}$ alkyl, $C_{6-20}$ aryl, halide and $C_{1-6}$ haloalkyl.

2. The composition of claim 1 in which the transition metal halide is a tungsten, molybdenum, or tantalum halide.

3. The composition of claim 1 in which the transition metal halide is tungsten hexachloride, tungsten oxytetrachloride, molybdenum oxytrichloride, molybdenum pentabromide, or mixtures thereof.

4. The composition of claim 1 in which the hydroquinone compound is selected from the group consisting of 2,5-di-t-butyl-1,4-hydroquinone, 2,3,5,6-tetrafluoro-1,4-hydroquinone, 2-t-butyl-1,4-hydroquinone, 2-chloro-1,4-hydroquinone, 2-(2-chlorophenyl)-1,4-hydroquinone, 2,3-dimethyl-1,4-hydroquinone, 1,4-hydroquinone, 2-methyl-1,4-hydroquinone, 2-phenyl-1,4-hydroquinone, 2,3,5-trimethyl-1,4-hydroquinone, and 2-trifluoromethyl-1,4-hydroquinone.

5. The composition of claim 1 in which the hydroquinone compound is present in an amount within the range of about 0.2 to about 2 moles per mole of the transition metal halide.

6. The composition of claim 1 which further comprises a co-catalyst selected from the group consisting of organo tin hydrides, borohydrides, and organo aluminum compounds.

7. The composition of claim 6 which further comprises a boron halide promoter.

8. The composition of claim 7 wherein the co-catalyst is tributyltin hydride.

9. The composition of claim 1 in which the transition metal halide is tungsten oxytetrachloride and the hydroquinone compound is 2,5-di-t-butyl-1,4-hydroquinone or 2,3,5,6-tetrafluoro-1,4-hydroquinone.

10. A polymerization mixture comprising the catalyst of claim 1 and a cyclic olefin.

11. The mixture of claim 10 in which the cyclic olefin is dicyclopentadiene.

12. The mixture of claim 10 further comprising a co-catalyst selected from the group consisting of organo tin hydrides, borohydrides and organo aluminum compounds.

13. A process comprising contacting, under polymerization conditions, a cyclic olefin monomer with the catalyst of claim 1 for a time sufficient to polymerize said cyclic olefin.

14. The process of claim 13 further comprising a co-catalyst selected from the group consisting of organo tin hydrides, borohydrides, and organo aluminum compounds.

15. The process of claim 13 in which the cyclic olefin comprises dicyclopentadiene.

16. The process of claim 13 in which the transition metal halide is a tungsten, molybdenum, or tantalum halide.

17. The process of claim 16 in which the hydroquinone compound is 2,5-di-t-butyl-1,4-hydroquinone or 2,3,5,6-tetrafluoro-1,4-hydroquinone.

18. A process for in-mold ring-opening metathesis polymerization of a cycloolefin monomer which comprises:
(a) introducing into a mold a reaction mixture comprising the cycloolefin monomer, a catalyst comprising a reaction product of a transition metal halide and a hydroquinone compound of the formula:

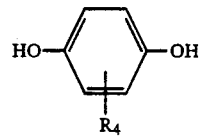

in which R is independently selected from the group consisting of hydrogen, $C_{1-12}$ alkyl, $C_{6-20}$ aryl, halide, and $C_{1-6}$ haloalkyl; and
(b) maintaining the reaction mixture under polymerization conditions for a time sufficient for polymerization of the monomer and formation of a molded article.

19. The process of claim 18 in which the cycloolefin monomer comprises dicyclopentadiene.

20. The process of claim 18 in which the transition metal halide is a tungsten, molybdenum, or tantalum halide.

21. The process of claim 20 in which the transition metal halide is selected from the group consisting of tungsten hexachloride, tungsten oxytetrachloride, molybdenum oxytrichloride, molybdenum pentabromide and mixtures thereof.

22. The process of claim 21 in which the hydroquinone compound is selected from the group consisting of 2,5-di-t-butyl-1,4-hydroquinone, 2,3,5,6-tetrafluoro-1,4-hydroquinone, 2-t-butyl-1,4-hydroquinone, 2-chloro-1,4-hydroquinone, 2-(2-chlorophenyl)-1,4-hydroquinone, 2,3-dimethyl-1,4-hydroquinone, 1,4-hydroquinone, 2-methyl-1,4-hydroquinone, 2-phenyl-1,4-hydroquinone, 2,3,5-trimethyl-1,4-hydroquinone, and 2-trifluoromethyl-1,4-hydroquinone.

23. The process of claim 20 in which the reaction mixture further comprises a co-catalyst selected from the group consisting of organo tin hydrides, borohydrides, and organo aluminum compounds.

24. The process of claim 20 in which the reaction mixture is introduced into the mold at an initial mold temperature within the range of about 20° to about 200° C.

25. The process of claim 20 in which the transition metal halide is tungsten oxytetrachloride and the hydroquinone compound is 2,5-di-t-butyl-1,4-hydroquinone or 2,3,5,6-tetrafluoro-1,4-hydroquinone.

* * * * *